(12) United States Patent
Bayer et al.

(10) Patent No.: US 6,497,038 B1
(45) Date of Patent: Dec. 24, 2002

(54) METHOD FOR ROLLER TAPPET SUSPENSION IN AN INTERNAL COMBUSTION ENGINE FOR REMOVAL OF A CAMSHAFT OR OTHER COMPONENTS

(75) Inventors: Frank A. Bayer, Summit, IL (US); Gary L. Davidson, Alsip, IL (US)

(73) Assignee: International Engine Intellectual Property Company, L.L.C., Warrenville, IL (US)

( * ) Notice: Subject to any disclaimer, the term of this patent is extended or adjusted under 35 U.S.C. 154(b) by 0 days.

(21) Appl. No.: 09/921,035

(22) Filed: Aug. 2, 2001

(51) Int. Cl.[7] ............................................. B23D 15/00
(52) U.S. Cl. ............................ 29/888.011; 29/888.01; 29/402.03; 29/402.08
(58) Field of Search .................. 29/888.011, 888.01, 29/402.03, 402.08; 123/193.5, 193.3

(56) References Cited

U.S. PATENT DOCUMENTS

| | | | | |
|---|---|---|---|---|
| 1,511,913 A | * | 10/1924 | Saunders | 29/888.011 |
| 3,979,811 A | | 9/1976 | Kammeraad | |
| 4,027,365 A | * | 6/1977 | Froeliger | 123/195 R |
| 4,292,719 A | | 10/1981 | Britton, Jr. | |
| 4,373,240 A | * | 2/1983 | Castoe | 269/50 |
| 4,688,313 A | | 8/1987 | Keller | |
| 4,864,708 A | | 9/1989 | Stapleton | |
| 4,996,768 A | | 3/1991 | Seyller | |
| 5,247,737 A | | 9/1993 | Perry et al. | |
| 6,094,814 A | * | 8/2000 | Defer | 29/402.08 |
| 6,134,765 A | | 10/2000 | Ward | |

* cited by examiner

*Primary Examiner*—I Cuda-Rosenbaum
(74) *Attorney, Agent, or Firm*—Dennis Kelly Sullivan; Jeffrey P. Calfa; Neil T. Powell

(57) ABSTRACT

There is provided a method for suspending roller tappets in an internal combustion engine without removal of the cylinder head and gasket. The rocker arm assembly is removed. Each push rod is then removed and replaced with tappet suspension tool to engage a corresponding roller tappet. A suspension tool guide bar is then installed to connect to the tappet suspension tools. The roller tappets are then simultaneously moved to a raised position away from the camshaft forming a clearance between the roller tappets and camshaft bearings. The roller tappets are then secured in the raised position by a securing block. The camshaft can then be removed from the engine block. Alternatively, the rear half of the front cover can be removed by first removing the idler gears, followed by removal of the camshaft, and last removing the rear half of the front cover from the engine case.

12 Claims, 8 Drawing Sheets

METHOD FOR ROLLER TAPPET SUSPENSION IN AN INTERNAL COMBUSTION ENGINE FOR REMOVAL OF A CAMSHAFT OR OTHER COMPONENTS

FIELD OF THE INVENTION

This invention relates generally to repair methods for internal combustion engines. More particularly, this invention relates to equipment and methods for installing and removing a camshaft or other engine components without removal of the cylinder head.

BACKGROUND OF THE INVENTION

In the course of engine repair and maintenance, defective or obsolete engine components are removed and replaced with new or similar engine components. The repair process typically requires the removal and subsequent reinstallation of other auxiliary or associated engine components due to limited space in the engine compartment of a vehicle. The repair process is many times time consuming, cumbersome, difficult and oftentimes expensive.

For example, the repair or replacement of an engine camshaft or rear half of a front cover typically requires the removal of the cylinder head and cylinder head gasket along with other engine components. Existing repair methods for replacing a camshaft require the removal of the cylinder head, and attached gasket, to gain access to the roller tappets which sit on the camshaft lobes. The roller tappets are then removed which allow removal of the camshaft. Further, not only must the cylinder head and cylinder head gasket be removed but a new cylinder head gasket must be used when reinstalling the cylinder head on the engine case or block. This is the case, since the cylinder head gasket is always damaged in removal process. Moreover, existing methods of repairing or replacing a camshaft or a rear half of the front cover, including removal and reinstallation of the cylinder head and new gasket, are time consuming (e.g., a typical time is on the order of 1.5 man-hours) which leads to higher repair costs.

Accordingly, there is a need for more efficient and cost effective method that does not require the removal of the cylinder head or cylinder head gasket, for the removal or replacement of internal combustion engine components, such a camshaft or a rear half of a front cover.

SUMMARY OF THE INVENTION

The present invention provides a method for suspending roller tappets (also know as cam followers or valve lifters) in an internal combustion engine without removing the cylinder head and cylinder head gasket. The suspension of the roller tappets in the engine allow for the simplified removal and replacement of front engine components such as a camshaft or the rear half of a front cover among others. The method of the present invention comprises the steps of removing the rocker arm assembly or assemblies on the engine. Next, each push rod is removed and replaced with a corresponding tappet suspension tool to thereby engage a top portion of corresponding roller tappet. A suspension tool guide bar is then installed such that the plurality of tappet suspension tools are connected and can then be simultaneously moved in unison. All roller tappets are then moved to or suspended in a raised position above the camshaft, via movement of the suspension tool guide bar, thereby forming a clearance between the roller tappets and camshaft bearings. Next, the roller tappets are secured in the raised position by installing securing blocks between the suspension tool guide bar and the engine case. This method can be used for removal of a camshaft or the front half of a front cover.

In an embodiment of the present invention, the method can be used to replace the camshaft in an engine without removing the cylinder head and cylinder head gasket. This method uses the steps just described plus the additional the step of removing the camshaft from the engine block. The replacement camshaft can be installed by following the steps in reverse order.

In another embodiment of the present invention, the method can be used to replace the rear half of a front cover, without removing the cylinder head and cylinder head gasket. This method uses the steps just described plus the additionalsteps of removing the idler gears, removing the camshaft from the engine case, and finally removing the rear half of the front cover from the engine case. A rear half front cover can then be installed by following the steps in reverse order.

The following drawings and description set forth additional advantages and benefits of the invention. Other advantages and benefits will be obvious from the description and may be learned by practice of the invention.

BRIEF DESCRIPTION OF THE DRAWINGS

The present invention may be better understood when read in connection with the accompanying drawings, of which.

DETAILED DESCRIPTION OF THE INVENTION

Figure 1:
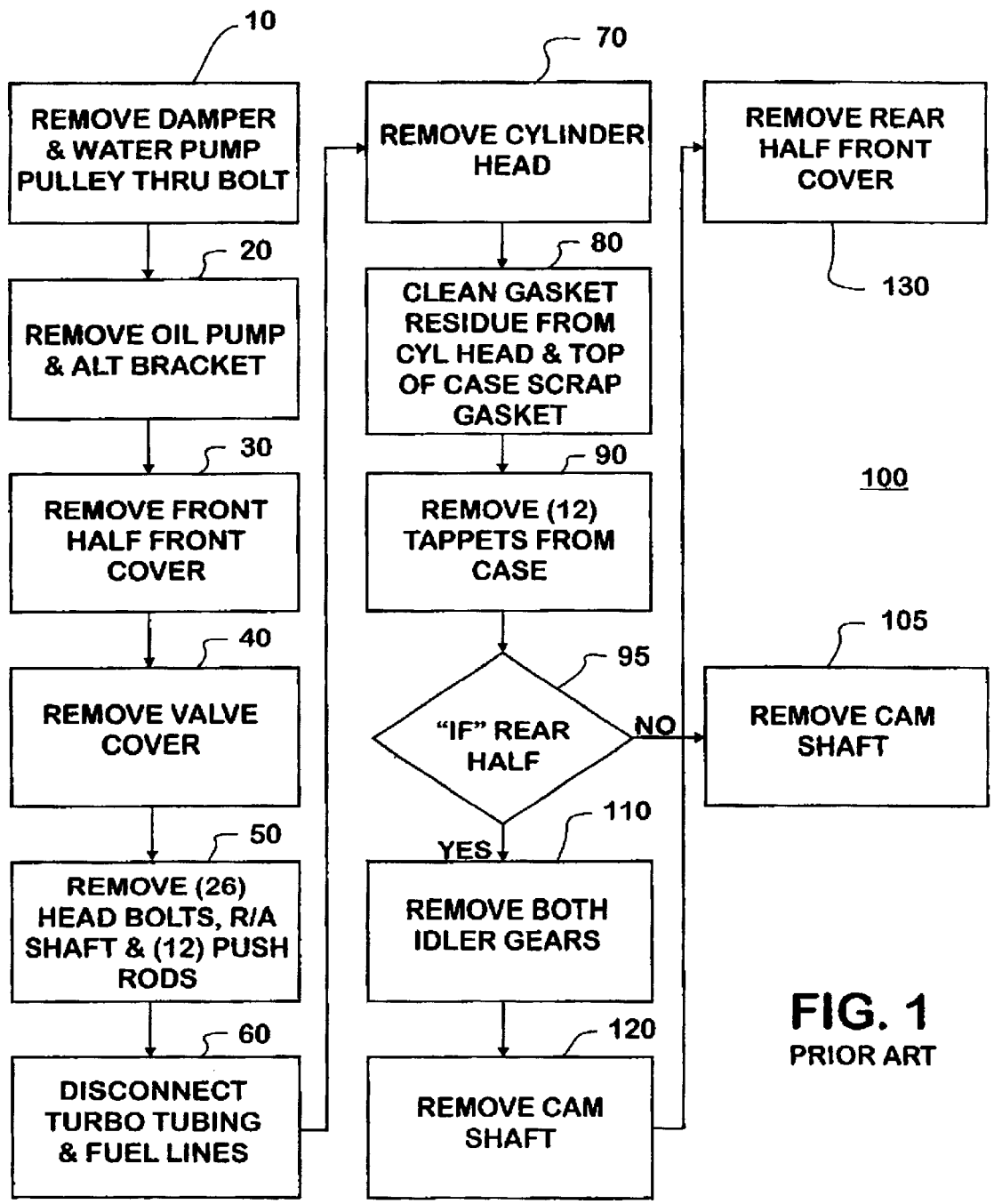
FIG. 1 shows a flow chart illustrating steps to replace a camshaft or rear half of a front cover according to a prior art method.

FIG. 1 illustrates a flowchart 100 showing a series of prior art steps commonly practiced to replace or remove a camshaft or the rear half of the front cover in an internal combustion engine, e.g., a diesel type engine. The flowchart 100 represents a typical in-line six cylinder diesel engine using push rods to translate the camshaft movement to the intake and exhaust valves. Those of skill in the art will recognize that this process is applicable to other engine configurations that used roller tappets, also know as cam followers or valve lifters, and pushrods to translate camshaft movement to the intake and exhaust valves. This includes other in-line engine configurations and V-type configurations.

As the flow chart 100 illustrates, various engine auxiliary components must be removed to allow access and removal of the camshaft and/or rear half of the front cover. In step 10, the damper and water pump pulley thrubolt is removed. In step 20, the oil pump and alternator bracket is removed. In step 30, the front half of the engine front cover is removed. In step 40, the engine valve cover is removed to give access to the components associated with actuation of the rocker arm assembly. In step 50, the head bolts, the rocker arm shaft or rocker arm assemblies and push rods are removed. Since FIG. 1 relates to an in-line six cylinder engine, there will be 12 push rods that must be removed. Other engine configurations could have a different number of push rods. In step 60, the turbo charger tubing and fuels lines are disconnected.

In step 70, the cylinder head is removed. Removing the cylinder head allows access to the roller tappets, which sit on or ride on the camshaft lobes. Significantly, the step of removing the cylinder head permanently damages the cylinder head gasket. In step 80, the cylinder head gasket is removed and any gasket residue is removed from the cylinder head and the top of the engine block or case. The damaged gasket is scrapped and a new cylinder head gasket will be required when the cylinder head is later reinstalled. This is a drawback since this increases the time and expense of using this method. In step 90, the roller tappets, which form a physical obstruction to the removal of the camshaft, are now removed from the engine block or case. Step 95 denotes that there are two possible paths that may be taken depending on whether the camshaft or rear half of the front cover is to be removed or replaced. In step 105, the camshaft is now removed. A replacement or repaired camshaft can now be installed.

Alternatively, when the rear half of the front cover is to be removed, additional steps are carried out as illustrated in FIG. 1. In step 110, once the roller tappets have been removed at step 90, the idler gears are removed. In step 120, the camshaft is removed. Last, in step 130, the rear half of the front cover can now be removed. A replacement or repaired front cover rear half can now be installed.

The steps illustrated in FIG. 1 can be tedious and time consuming. Such a process can typically take 90 to 210 minutes to complete. Further, this commonly practiced method is can be expensive since the cylinder head gasket is permanently damaged, upon removal of the cylinder head, and must be replaced each time the camshaft or front cover rear half must be repaired.

Figure 2:
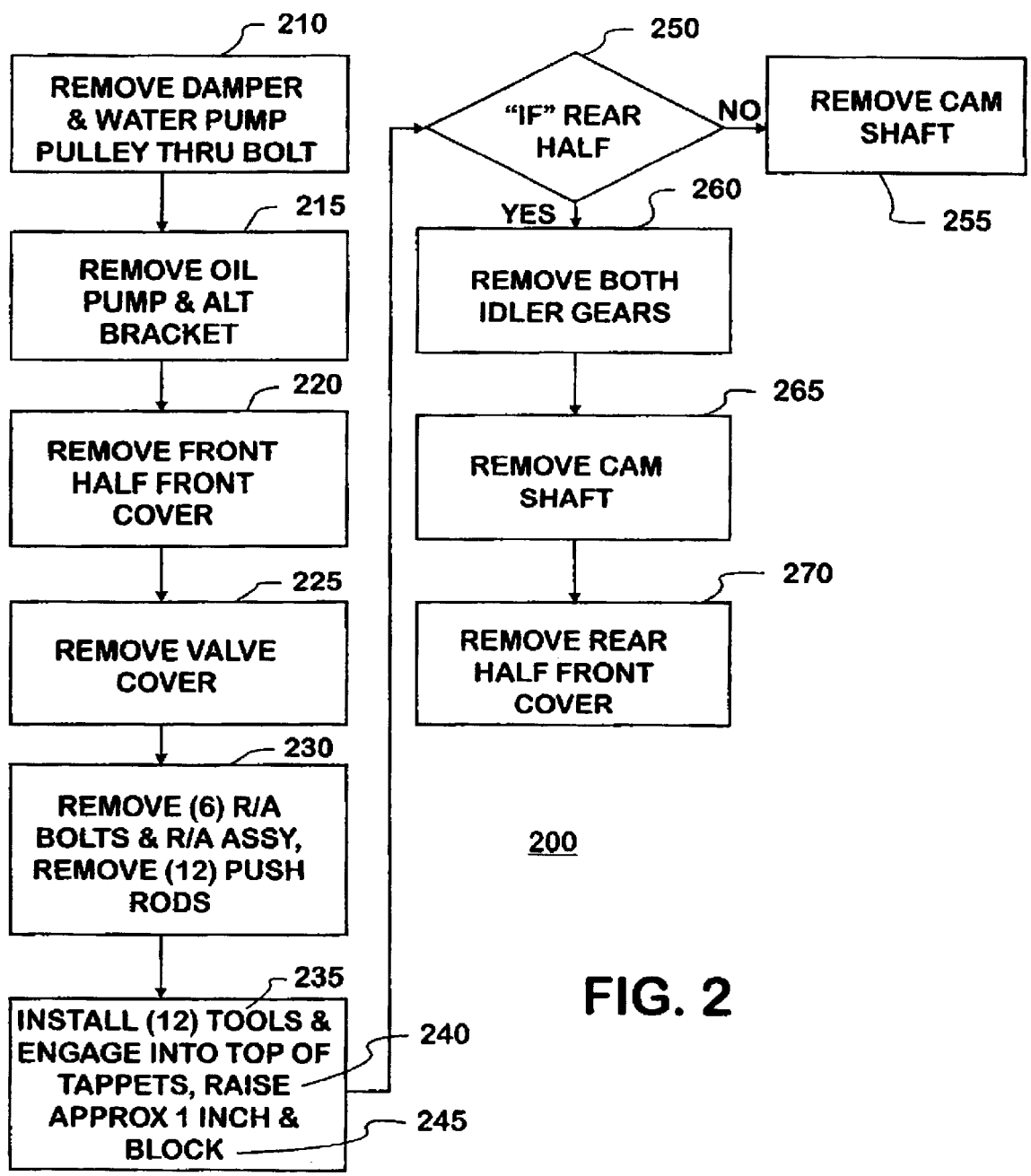
FIG. 2 shows a flow chart illustrating steps to replace a camshaft or rear half of the front cover according to an embodiment of the present invention.
Figure 7A:
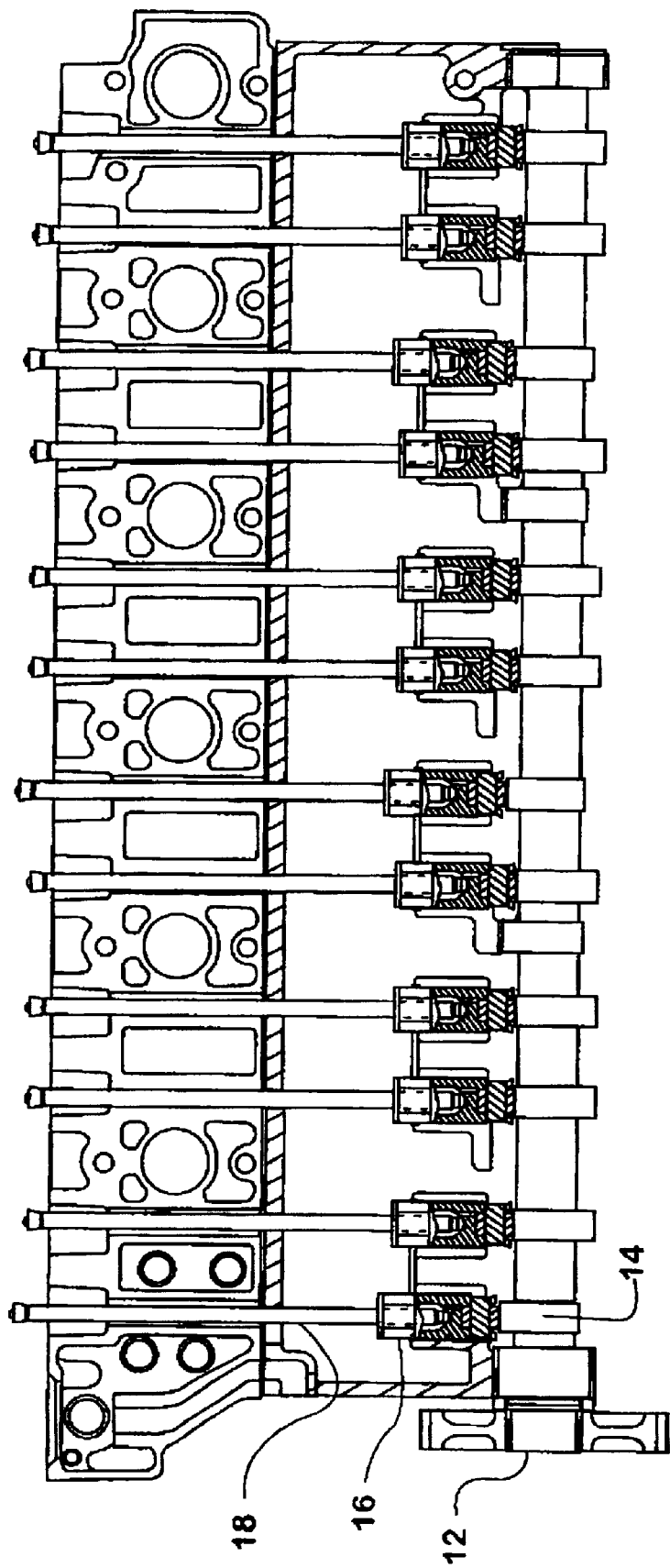
FIG. 7A shows a cross-sectional view at a vertical line through the center of the roller tappets prior to removal of the push rods according to the present invention.

FIG. 2 illustrates a flowchart 200 showing an embodiment of the novel method for suspending roller tappets 16 in an engine without the need to remove the cylinder head and gasket according to the present invention. The method of the present invention will significantly reduce the material costs and labor time associated with the replacement of a camshaft or rear half of a front cover. The flowchart 200 illustrated in FIG. 2 is preferably for use on an in-line six cylinder diesel engine using push rods 18 to translate the camshaft movement to the intake and exhaust valves, as shown in FIG. 7A. However, those of skill in the art will readily recognize that this process is applicable to other engine configurations that use roller tappets and pushrods to translate camshaft movement to the intake and exhaust valves. This includes other in-line engine configurations and V-type configurations.

Figure 7B:
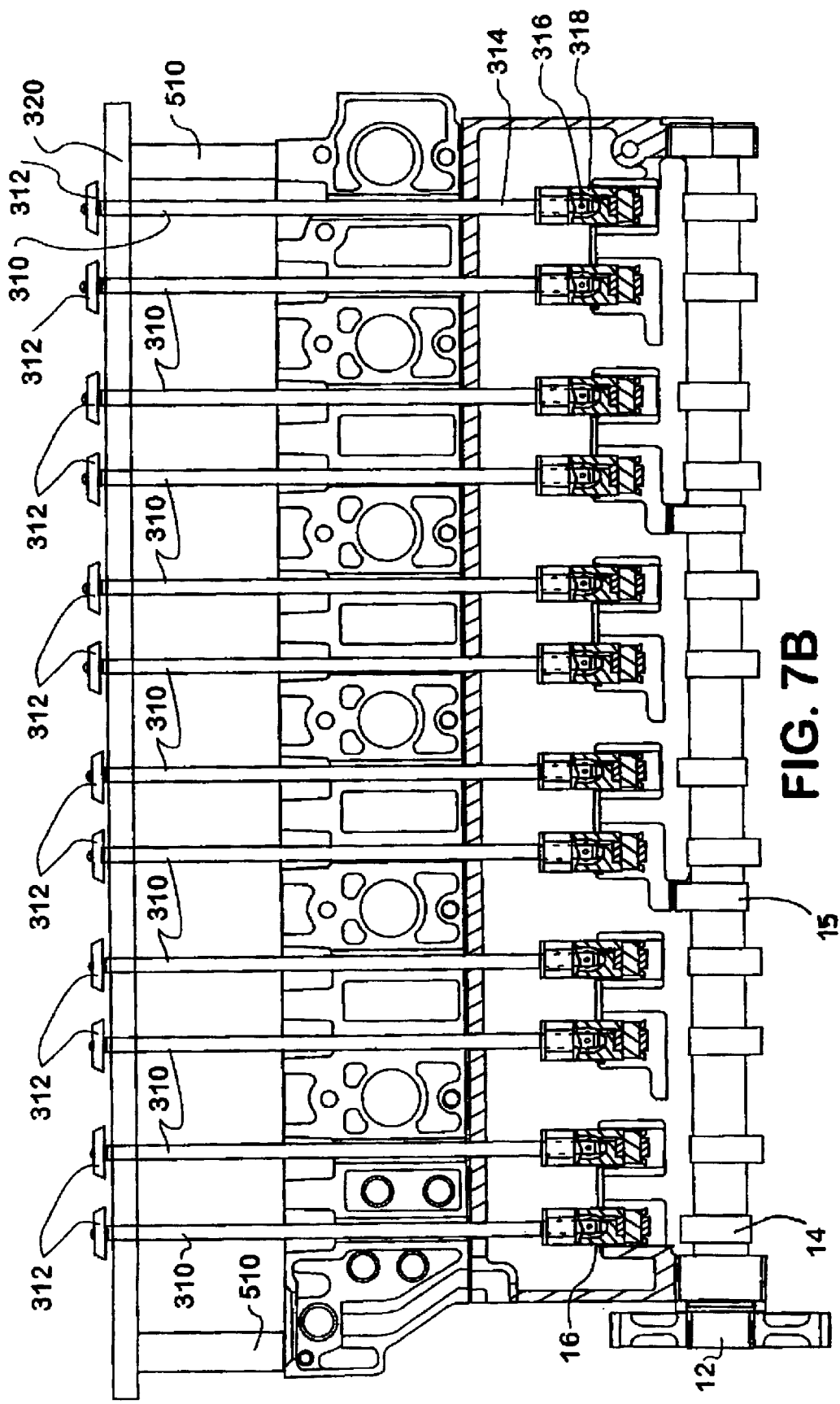
FIG. 7B shows a cross-sectional view at a vertical line through the center of the roller tappets after the tappets are raised according to the present invention.

In step 210, the damper and water pump pulley thru-bolt is removed. In step 215, the oil pump and alternator bracket is removed. In step 220, the front half of the engine front cover is removed. In step 225, the engine valve cover is removed to gain access to the components associated with actuation of the valves. In step 230, the rocker arm bolts, rocker arm assemblies and push rods 18 are removed. Those of skill in the art will readily recognize that the appropriate number of rocker arm bolts and assemblies will be removed depending on the number of cylinders in the particular engine application used, e.g., a four or eight cylinder inline engine or V-6 or V-8 engine, etc. Also, there are 12 push rods 18 that must be removed since FIG. 2 relates to an in-line six cylinder engine. Other engine configurations could have a different number of push rods. Removal of the push rods 18 allows access to the roller tappets 16 via the voids left by the removed push rods 18, as shown in FIG. 7B. Notably, the cylinder head is left in place, unlike prior art methods such as the one illustrated in FIG. 1.

Next, in step 235, a plurality of roller tappet suspension tools 310 engage the tops of corresponding roller tappets. A roller tappet suspension tool 310 is preferably inserted through each push rod cavity in the cylinder head (shown in FIGS. 3 and 4) and takes the place of the just removed push rods 18. The inserted roller tappet suspension tool 310 will preferably have a spring loaded ball pin 316 at a bottom tip end 314 that will correspondingly engage or connect to the top portion 318 of the roller tappet 16, as shown in FIG. 7B. In this manner, the roller tappet 16 is connected to the tappet suspension tool 310 and can thereby move up or down when the tappet suspension tool 310 is moved, i.e., raised or lowered. The roller tappet suspension tool 310 will have a length that is appropriate such that the extension tool 310 can reach and engage the roller tappet 16 and allow the extension tool 310 to be raised and lowered relative to the engine case. The length of the tappet suspension tool 310 can vary depending on the type of engine that is being worked on.

Figure 3:
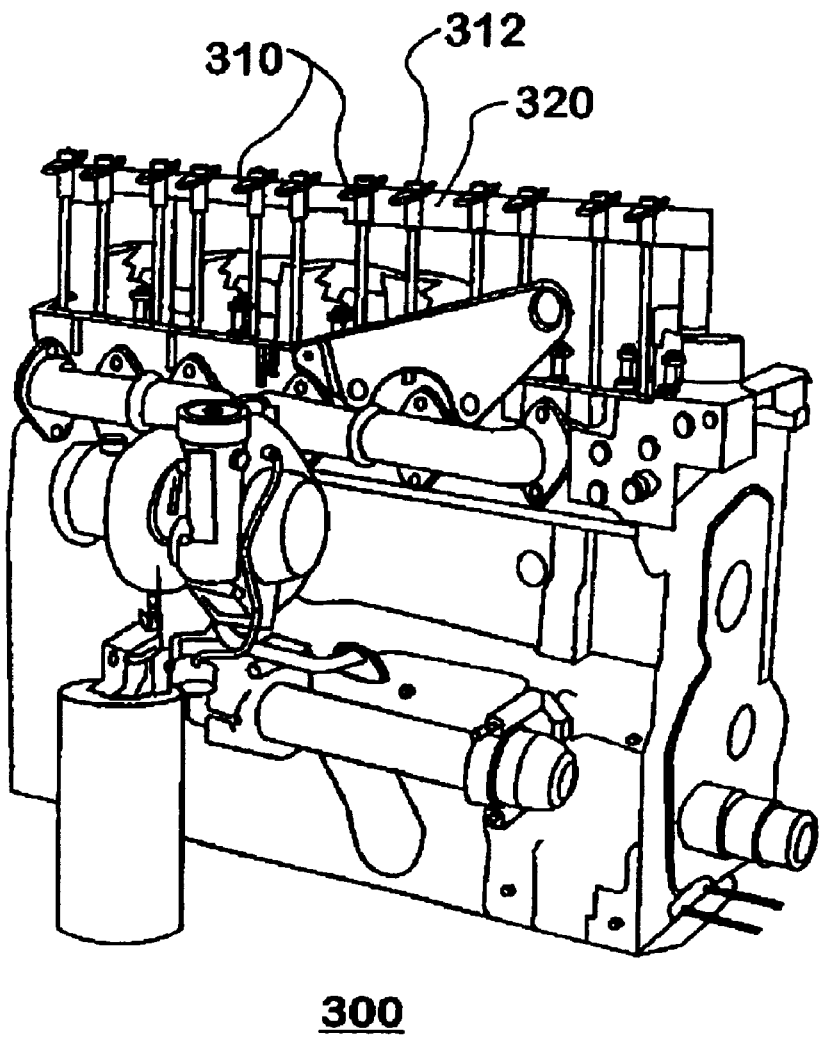
FIG. 3 shows a perspective view of a plurality of roller tappet suspension tools simultaneously attached to a suspension tool guide bar according to the present invention illustrated in FIG. 2.

A suspension tool guide bar 320 is installed to engage the top ends 312 of the plurality of tappet suspension tools 310 (shown in FIG. 3). The roller tappets 16 can then be simultaneously moved by raising or moving the suspension tool guide bar 320. In a preferred embodiment, the suspension tool guide 320 is a relatively straight lengthwise bar or member with a series of indentations or notches. The notches or indentations will each engage or connect to a top end 312 of the plurality of tappet suspension tools 310 allowing for simultaneous movement of the tappet suspension tools 310 (shown in FIGS. 3 and 4). Those of skill in the art will readily recognize that the suspension tool guide bar 320 can have any number of configurations that will allow for simultaneous movement of the extension tools 310 to a pre-determined distance.

In step 240, the roller tappets 16 are lifted or moved to a raised position away from the camshaft 12 or camshaft lobes 14 upon which they interact with. The roller tappets 16 are preferably lifted simultaneously by the suspension tool guide bar 320. However, the roller tappets 16 could also be raised in another sequence, so long as they are suspended in or moved to a raised position. The raised position is preferably about one inch from the camshaft. Those of skill in the art will recognize that the raised position may be other than one inch away from the camshaft depending on the type of engine being repaired. More importantly, the raised position of the roller tappets 16 must be a sufficient distance or clearance to allow the camshaft bearings to clear the raised roller tappets 16, or to be free of interference from the tappets 16 so that the camshaft 12 can be removed in Step 255 or Step 265.

Figure 5:
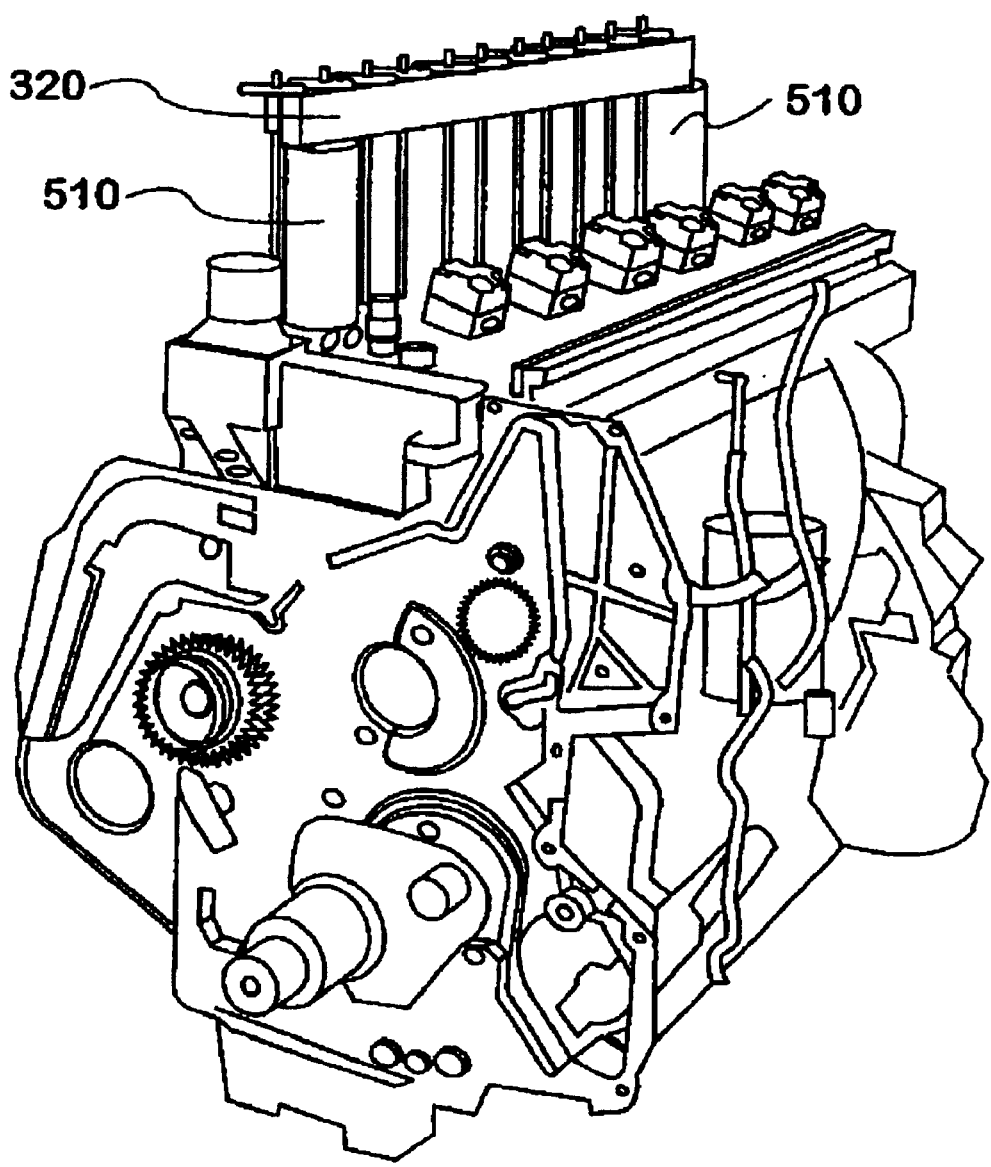
FIG. 5 shows a front perspective view of the roller tappet suspension tools simultaneously raised and blocked in place according to the present invention illustrated in FIG. 2.

In step 245, the roller tappets 16 are secured or blocked in the raised position (shown in FIG. 5). The tappets 16 are preferably secured in the raised position by placing securing blocks 510 (shown in FIG. 5 and FIG. 7) at opposite ends of the suspension tool guide bar 320 and resting the blocks on the engine case. Those of skill in the art will readily recognize that more or less securing blocks 510 could be used. Also, other securing means may be employed to secure the roller tappets in the raised position. Of importance is that the roller tappets 16 need to be secured in the raised or suspended position so that the camshaft bearings 15 will clear the roller tappets 16, i.e., encounter no physical interference from the roller tappets 16, when the camshaft 12 is removed.

Step 250 simply denotes that depending on whether the camshaft 12 or rear half of the front cover is to be removed or replaced there are two possible paths that can be taken from this point. In step 255, the camshaft 12 is now removed. The camshaft 12 is preferably removed from the engine case by laterally sliding or pulling the camshaft 12 out from the Engine case (shown in FIG. 6). Since the roller tappets 16 are now in a raised or suspended position relative to the camshaft 12, the camshaft 12 can now be removed and replaced without the need to remove the cylinder head and cylinder head gasket. A replacement or repaired camshaft can now be installed by simply following the designated steps in reverse order.

Alternatively, when the rear half of the front cover is to be removed additional steps are necessary as depicted in FIG. 2. In step 260, once the roller tappets 16 are secured in a raised position at steps 240 and 245, the idler gears are removed. In step 265, the camshaft 12 is now laterally removed (similarly to that described in step 255). Last, in step 270, the rear half of the front cover can be removed without removing the cylinder head and cylinder head gasket. A replacement or repaired front cover rear half can be installed by reversing the order of the designated steps.

Figure 4:
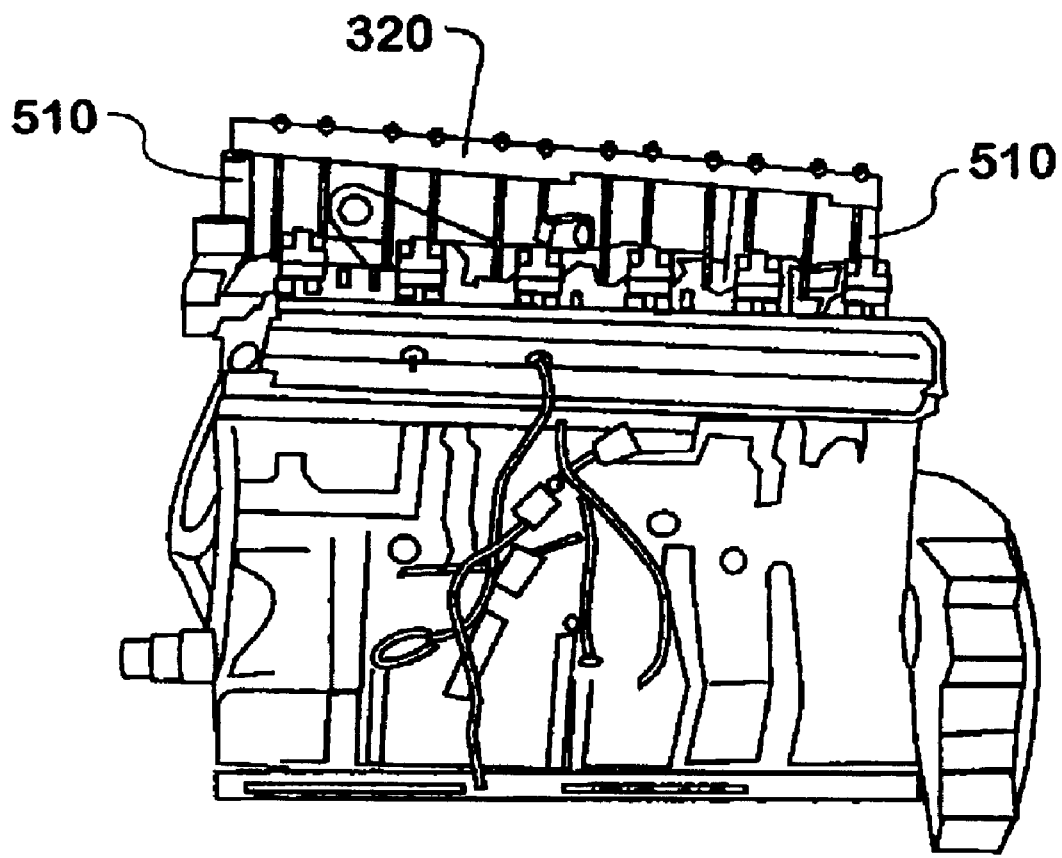
FIG. 4 shows a side perspective view of a the plurality of roller tappet suspension tools simultaneously attached to a suspension tool guide bar according to the present invention illustrated in FIG. 2.

FIG. 3 is a perspective view of an in-line six cylinder engine with a plurality of roller tappet suspension tools 310 simultaneously attached to the suspension tool guide bar 320. The suspension tool guide bar 320 is preferably attached to the top ends 312 of the suspension tools 310 and will be used to simultaneously move the roller tappets away from the camshaft 12 to a desired raised position of about 1 inch from the camshaft lobes 14. FIG. 4 shows a rear perspective view of the roller tappet suspension tools 310 simultaneously supported by the suspension tool guide bar 320 shown in FIG. 3.

Figure 6:
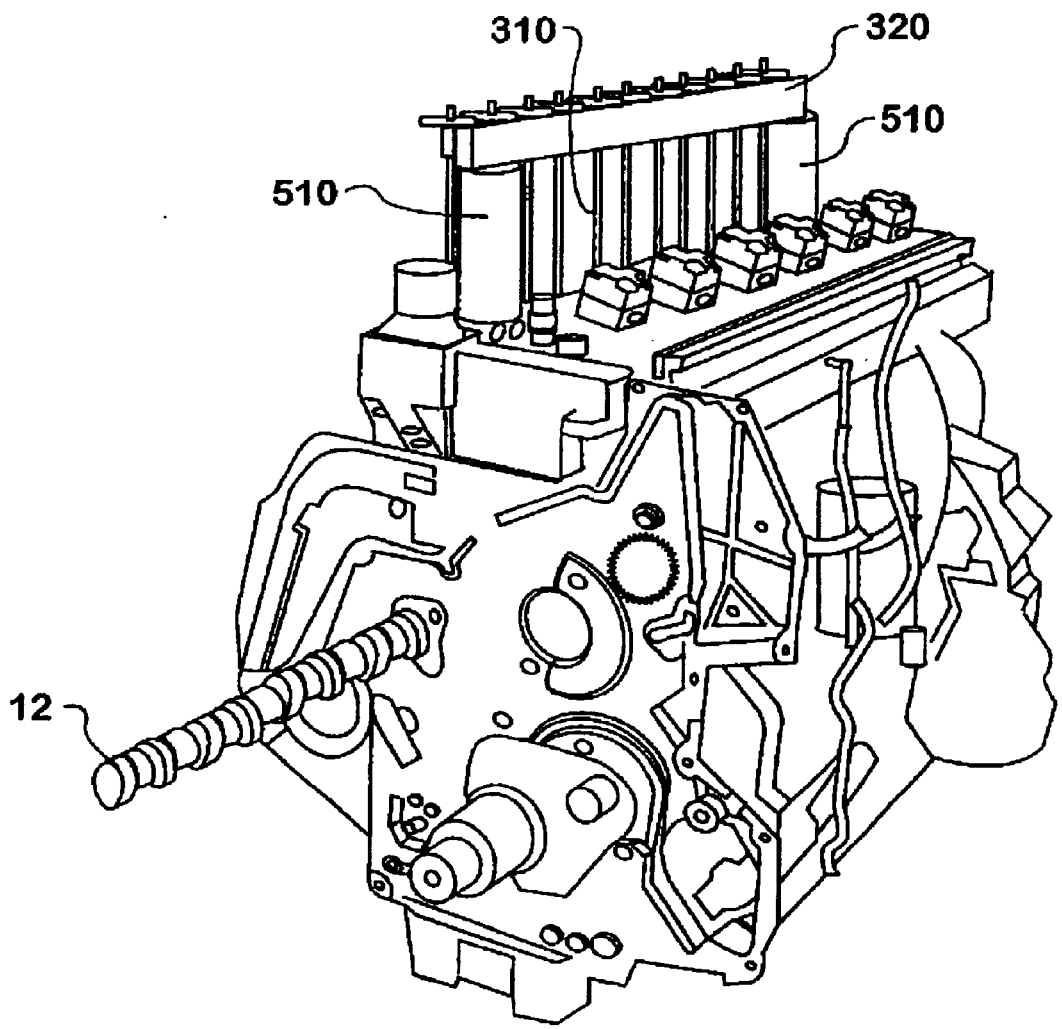
FIG. 6 shows a front perspective view of the lateral removal of the camshaft according to the present invention illustrated in FIG. 2.

FIG. 5 shows a front perspective view of steps 240 and 245 of FIG. 2 where the roller tappets 16 are in the raised or suspended position. The roller tappet suspension tools 310 are shown simultaneously raised, via the suspension tool guide bar 320, and preferably secured in the raised position through a pair of securing blocks 510. In this manner, the camshaft 12 can be easily removed without removing the cylinder head and gasket. FIG. 6 is a front perspective view representative of step 255 of FIG. 2 showing the lateral removal of the camshaft 12 after the roller tappets have been raised and blocked via the extension tools 310, the suspension tool guide bar 320 and the securing blocks 510.

The present invention has been described and illustrated by way of certain examples of preferred embodiments relating to in-line internal combustion engines. However, the invention may be used on other types of engines for fast and economical repair, removal and replacement of camshafts or front cover rear halves. Additional advantages will be readily apparent to those skilled in the art who may modify the embodiments without departing from the true spirit and scope of the invention. Therefore, this invention is not limited to the specific details, representative devices, and illustrated examples in this description. The present invention is limited only by tie following claims and equivalents.

We claim:

1. A method for suspending roller tappets in an engine case, the method comprising the steps of:
   removing rocker arm assemblies;
   removing push rods and inserting a plurality of corresponding tappet suspension tools therein to thereby engage a plurality of corresponding roller tappets;
   installing a suspension tool guide bar to thereby connect the plurality of tappet suspension tools;
   moving the plurality of roller tappets simultaneously to a raised position thereby forming a clearance between the roller tappets and camshaft bearings; and
   securing the roller tappets in the raised position.

2. The method of claim 1, wherein the roller tappets are moved via movement of the suspension tool guide bar.

3. The method of claim 1, wherein the raised position is one inch away from the camshaft.

4. The method of claim 1, wherein the roller tappets are secured in the raised position via at least one securing block positioned between the suspension tool guide bar and the engine case.

5. The method of claim 1, wherein the suspension tool guide bar is secured to a top end on each tappet suspension tool.

6. The method of claim 1, wherein each tappet suspension tool engages a top portion on the roller tappets.

7. The method of claim 1, further comprising the step of removing the camshaft from the engine case.

8. The method of claim 1, further comprising the steps of:
   removing idler gears;
   removing the camshaft from the engine case; and
   removing a rear half of a front cover from the engine case.

9. A method for removing a camshaft from an engine case, the method comprising the steps of;
   removing rocker arm assemblies;
   removing push rods and inserting a plurality of corresponding tappet suspension tools therein to thereby engage a plurality of corresponding roller tappets;
   installing a suspension tool guide bar to thereby connect the plurality of tappet suspension tools;
   moving the plurality of roller tappets simultaneously to a raised position thereby forming a clearance between the roller tappets and camshaft bearings;
   securing the roller tappets in the raised position; and
   removing the camshaft from the engine case.

10. A method for removing a camshaft from an engine, the method comprising the steps of:
    removing rocker arm assemblies;
    removing push rods and inserting corresponding tappet suspension tools therein to thereby engage corresponding roller tappets;
    installing a suspension tool guide bar to thereby connect the tappet suspension tools;
    simultaneously moving the roller tappets to a raised position, via movement of the suspension tool guide bar away from the camshaft, thereby forming a clearance between the roller tappets and camshaft bearings;

securing the tappet suspension tools in the raised position; and laterally removing the camshaft from an engine case.

11. A method for removing a rear half of a front from an engine case, the method comprising the steps of:

removing rocker arm assemblies;

removing push rods and inserting a plurality of corresponding tappet suspension tools therein to thereby engage a plurality of corresponding roller tappets;

installing a suspension tool guide bar to thereby connect the plurality of tappet suspension tools;

moving the plurality of roller tappets simultaneously to a raised position thereby forming a clearance between the roller tappets and camshaft bearings;

securing the roller tappets in the raised position via at least one securing block;

removing idler gears;

removing a camshaft from an engine case; and removing the rear half of the front cover.

12. A method for removing a rear half of a front from an engine, the method comprising the steps of:

removing rocker arm assemblies;

removing push rods and inserting corresponding tappet suspension tools therein to thereby engage corresponding roller tappets;

installing a suspension tool guide bar to thereby connect the tappet suspension tools;

simultaneously moving the roller tappets to a raised position, via movement of the suspension tool guide bar away from the camshaft, thereby forming a clearance between the roller tappets and camshaft bearings;

securing the tappet suspension tools in the raised position via at least one securing block;

removing idler gears;

removing a camshaft from an engine case; and removing the rear half of the front cover.

* * * * *